(12) United States Patent
Hinds et al.

(10) Patent No.: US 7,092,119 B1
(45) Date of Patent: Aug. 15, 2006

(54) METHOD, SYSTEM, AND PROGRAM FOR MANAGING CALIBRATION FILES IN A PRINTING SYSTEM

(75) Inventors: Arianne Therese Hinds, Boulder, CO (US); Deborah Elizabeth Neuhard, Longmont, CO (US); Jeanine Reeves, Lafayette, CO (US); Nenad Rijavec, Longmont, CO (US); Mikel John Stanich, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/378,648

(22) Filed: Aug. 20, 1999

(51) Int. Cl.
*G06F 15/00* (2006.01)

(52) U.S. Cl. .................. 358/1.9; 358/1.11; 358/1.12; 358/1.13; 358/1.14; 358/1.15; 358/447; 358/429; 358/448; 358/504; 358/534; 358/535; 358/536; 358/3.06; 358/3.09; 382/237; 382/248; 707/321; 707/327

(58) Field of Classification Search ............... 358/1.9, 358/1.11, 1.12, 1.13, 1.14, 447, 429, 448, 358/1.15, 504, 534, 535, 536, 3.06, 3.09, 358/298, 518, 523; 382/237, 248; 707/321, 707/327
See application file for complete search history.

(56) References Cited

U.S. PATENT DOCUMENTS

| | | | |
|---|---|---|---|
| 4,929,978 A * | 5/1990 | Kanamori et al. | 355/38 |
| 5,185,673 A * | 2/1993 | Sobol | 358/296 |
| 5,333,069 A * | 7/1994 | Spence | 358/517 |
| 5,365,602 A * | 11/1994 | Levien | 382/299 |
| 5,416,613 A * | 5/1995 | Rolleston et al. | 358/518 |
| 5,537,516 A * | 7/1996 | Sherman et al. | 358/1.9 |
| 5,546,165 A * | 8/1996 | Rushing et al. | 399/78 |
| 5,649,073 A * | 7/1997 | Knox et al. | 358/1.9 |
| 5,748,330 A * | 5/1998 | Wang et al. | 358/3.21 |
| 5,760,913 A * | 6/1998 | Falk | 382/167 |
| 5,787,238 A * | 7/1998 | Wang | 358/1.9 |
| 5,818,960 A * | 10/1998 | Gregory et al. | 382/167 |
| 5,854,882 A * | 12/1998 | Wang | 358/1.9 |
| 6,137,596 A * | 10/2000 | Decker et al. | 358/1.9 |
| 6,266,155 B1 * | 7/2001 | Lee et al. | 358/3.14 |
| 6,351,263 B1 * | 2/2002 | Naoi | 345/589 |
| 6,421,620 B1 * | 7/2002 | Kotlow | 702/67 |
| 6,498,661 B1 * | 12/2002 | Brossman et al. | 358/3.14 |
| 6,512,597 B1 * | 1/2003 | Cooper et al. | 358/1.9 |
| 6,606,165 B1 * | 8/2003 | Barry et al. | 358/1.9 |
| 6,636,326 B1 * | 10/2003 | Zuber | 358/1.14 |

* cited by examiner

*Primary Examiner*—David Moore
*Assistant Examiner*—Michael Burleson
(74) *Attorney, Agent, or Firm*—David W. Victor; Konrad Raynes & Victor LLP (57) ABSTRACT

Disclosed is a method, system, and program for managing calibration files in a printing system. Patches are printed using a screening algorithm and incorporating at least one output appearance factor. A calibration file is generated from measured color values of the printed patches mapping a color space for the printed patches to a color space of a printer used to print the patches. Information is associated with the calibration file indicating the printer and at least one output appearance attribute for use in selecting one calibration file to use when printing a print job.

40 Claims, 4 Drawing Sheets

METHOD, SYSTEM, AND PROGRAM FOR MANAGING CALIBRATION FILES IN A PRINTING SYSTEM

BACKGROUND OF THE INVENTION

1. Field of the Invention

The present invention relates to a method, system, and program for managing calibration files and, in particular, selecting a calibration file matching output-appearance attributes associated with a print job to use to calibrate the print job.

2. Description of the Related Art

To print an image, the image is first scanned by an input device and transformed to a gray scale representation of the image. A gray scale image is comprised of a matrix of thousands of pixels such that each pixel has a color or shade of grey value indicating a color or shade of grey for the pixel. In a 256 color system, each pixel may have one of 256 different color or shade of grey values. After an image is scanned, the gray scale bit map produced by the scanner must be further processed into a bit map format that the printer can process. Because most printers only print a limited number of colors or either black or white, the gray scale image is converted, using a halftone process, into a bi-level or halftone image, where each bit map value indicates either black or white. Thus, a halftoning transformation is applied to the gray scale image to convert the gray scale representation of the image to a bi-level image. The halftoning transformation would use dithering, also referred to as screening, to simulate the shades of grey or colors in the gray scale image by varying the pattern of dots. Thus, the result of dithering is a bi-level bit or halftone map where each value indicates one of two colors—black or white, with the dithering used to simulate shades. Contone printers print a limited number of shades of a color or grey. Thus, a processed bit map for a contone printer may include a limited number of values for each bit map value, such as eight, and also use dithering to simulate additional shades of grey and color.

Many images are stored as variants of red, green, and blue, i.e., RGB system. However, printers use the colors cyan, magenta, yellow, and black to print, i.e. CMYK. When printing an image in an RGB format, such as an image displayed on the monitor, the RGB image is first transformed to a device dependent CMYK color space that corresponds to the RGB space. However, different printers produce varying output given the same CMYK input color space. The ability of a printer to reproduce an input image may be affected by many printing variables, such as the model of the printer, the age of the printer, the paper, toner, and environmental variables, such as temperature and pressure. All these variables affect how a printer produces an image from the CMYK input color space.

To account for variables, a printer is calibrated. Calibration occurs by having the subject printer print patches of colors having known color values. A device referred to as a densitometer than measures the printed color values. The printed color values are than compared to the actual value of the colors maintained for the patches. Mathematical interpolation is used to generate a calibration curve which relates the actual printer measured output to the input patch of colors. This calibration curve provides a mapping from input color values, in a device independent CMYK space, to printer CMYK values that will produce the desired colors. Thus, the calibration curve maps the target or colors of the actual gray scale image to the printer, device dependent, CMYK color space. After the calibration curve is applied to adjust the input color or grayscale values, a halftone and dithering algorithms are applied to convert the calibrated gray scale image into a bi-level matrix where each pixel has only one of two values, or for a contone printer one of only a few values.

In current printing systems, the printer or server managing printer operations will include some factory provided calibration curves to apply to an input CMYK color space. Printer manufactures typically provide a calibration curve file for a printer model. This factory printer model calibration curve is then used for any output for that model printer, regardless of the presence of additional printing variables that may not have been present when the calibration curve was generated at the factory. In the publishing environment where print quality is essential, the publisher may generate specific calibration curves for a printer operation as the factory provided calibration curves may not account for numerous printing variables under which the publisher is printing, such as the age of the printer, paper, toner, temperature, etc. However, after generating such printer specific calibration curves for use with that printer, the publisher may discard the calibration curve files or save the new calibration curve in place of the factory provided calibration level. Large publishers could generate numerous calibration curves during the course of printing different publications. After using the calibration curves for the specific publishing job, they are then usually discarded or maintained by the publisher to manually select again when submitting a print job.

There is a need in the art for a system for effectively and automatically managing user generated calibration files.

SUMMARY OF THE PREFERRED EMBODIMENTS

To overcome the limitations in the prior art described above, preferred embodiments disclose a system, method, and program for managing calibration files in a printing system. Patches are printed using a screening algorithm and incorporating at least one output appearance factor. A calibration file is generated from measured color values of the printed patches mapping a color space for the printed patches to a color space of a printer used to print the patches. Information is associated with the calibration file indicating the printer and at least one output appearance attribute for use in selecting one calibration file to use when printing a print job.

In further embodiments, patches are printed by selecting one printer, one screening algorithm for the selected printer, and at least one output appearance factor of the print job. In such embodiments, information is associated with the calibration file by associating: a printer name indicating the selected printer; a screening name indicating the selected screening algorithm; and an appearance tag indicating the selected at least one output appearance factor.

In still further embodiments, a print job is generated comprising a halftone image. Output appearance and printer attribute information is associated with the print job for use in selecting one calibration file to use to calibrate the halftone image when printing the print job.

In yet further embodiments, the calibration file to use is selected from the calibration files having associated output appearance and printer information indicating compatibility with the printer and output appearance information associated with the print job.

Preferred embodiment provide a color management system to associate information with calibration files indicating any special attributes of the calibration files, such as printer and screening algorithm used to generate the calibration file and specific output-appearance factors incorporated into the calibration curves. Printer and output-appearance information is also associated with a submitted print job. The information associated with calibration files is then compared to the output-appearance information associated with the submitted print jobs to automatically select a calibration file having printer, screening, and output appearance attributes that match the attributes associated with the print job. Thus, preferred embodiments provide a file system architecture for storing user generated calibration files that is used to allow the system to automatically select a user generated calibration file that is compatible with the print job request.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
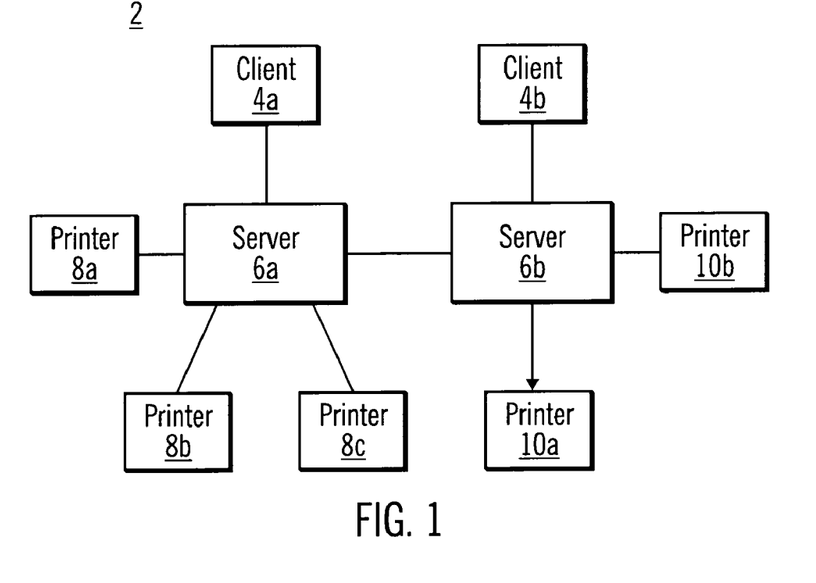
FIG. 1 is a block diagram illustrating a computing environment in which preferred embodiments of the present invention are implemented.

FIG. 1 illustrates a network printing environment in which preferred embodiments are implemented. Client computers 4a, 4b are each connected to one or more servers 6a, b. These servers 6a and 6b manage print operations at printers 8a, b, c and 10a, b, respectively. Thus, client 4a submits print jobs to server 6a and client 4b to server 6b. If the job is intended for one of the printers 8a, b, c, then server 6a would process the print job to produce a bi-level image that can be printed by the printer. If the print job was intended for printers 10a, b, then server 6a would transfer the print job to server 6b to transform and then print on printers 10a, b. The clients 4a, b may communicate with the servers 6a, b over a network, and the servers 6a, b may communicate in a peer-to-peer network or in a token ring network. The printers 8a, b, c, and 10a, b may be connected to their respective servers 6a, b either directly or over a network.

The clients 4a, b may be any workstation or personal computer, or other computing system, known in the art and include software, such as the IBM Infoprint submit software, to generate and send print jobs to the servers 6a, b. The servers 6a, b may be separate stand alone servers including an operating system such as AIX, OS/390, UNIX, OS/2, MVS, WINDOWS, etc. The servers 6a, b would include publishing software and are preferably suited for processing multiple large image files for different print jobs, e.g., different documents and books, such as the IBM Infoprint Manager software that runs on the IBM RS/6000 server under the AIX operating system. Details of certain features of the Infoprint submit and manager software are described in the IBM publication entitled "IBM Infoprint Manager for AIX: User's and Operator's Guide Version 3, Release 1," IBM publication no. S544-5596-00 (October, 1998), which publication is incorporated herein by reference in its entirety. The printers 8a, b, c and 10a, b may be any suitable printer machine known in the art, including printers capable of handling large scale publishing jobs, such as printing numerous copies of books or other materials. The network interconnecting the clients 4a, b to the servers 6a, b may be comprised of any suitable network architecture known in the art, such as LAN, Ethernet, WAN, System Area Network (SAN), Token Ring, LocalTalk, TCP/IP, the Internet, etc. Alternatively, there may be separate and different networks between the clients 4a, b, servers 6a, b, and printers 8a, b, c and 10a,b.

**AIX, OS/2, and RS/6000 are registered trademarks of IBM and OS/390 and MVS are trademarks of IBM; WINDOWS is a registered trademark of Microsoft Corporation; UNIX is a registered trademark licensed by the X/Open Company LTD; DOCUTECH is a trademark of Xerox Corporation.

Naming Convention for Halftone Attributes

Two steps in printing a gray scale representation of an image comprise, one, applying a calibration curve to calibrate the gray scale image and, two, applying a halftone screening or dithering algorithm to covert the gray scale image to a halftone, bi-level image capable of being processed by the printer. The calibration curve maps target color values in a device independent gray scale file to color values that will cause the printer to produce the target color values. The printer servers 6a, b store calibration files, specific to particular printers, and screens.

Preferred embodiments attach a halftone attribute to a print job and calibration curve files that is comprised of a screen-name and output-appearance components. The output-appearance component indicates particular printing and/or environment factors and variables under which the calibration file was generated. For instance, a user may want to generate a calibration curve using a particular printer, paper type, toner and/or under different environmental conditions, e.g., temperature, pressure, facility, etc. Further, the user may want a printer to emulate the output appearance of a particular target printer model produced by another manufacturer. Such a calibration curve is tailored to incorporate specific printing variables, e.g., target printer type, paper, toner, environmental factors, etc., into the mapping from the device independent input color space to the printer color space. In storing the user generated calibration curve, a file name would be associated with the calibration curve having the following name components:

printer name: a name of a particular printer in the system 2 used to generate the calibration curve or a printer model if the calibration curve will be used with all printers of the particular model type;

screen name: the file name of the halftone dithering algorithm used to convert the calibrated gray scale image to a halftone bi-level to print the set of patches that were measured when generating the calibration curve.

appearance tags: descriptive attributes of printing variables under which the calibration curve was generated, e.g., type of paper, toner, temperature conditions, and/or a target printer appearance to emulate, etc.

When printing, the user at the clients 4a, b may specify the following halftone attributes of screen name and output appearance. The output appearance component includes certain of the appearance tags, which would indicate such printing variables as target printer to emulate, paper, toner, temperature, etc., the user wants to incorporate in the current print job.

The server 6a, b upon receiving a print job with user specified halftone attributes would then select the calibration curve and screen name that would support the halftone attributes attached to the print job. In preferred embodiments, the halftone attributes of a calibration curve are maintained in the file name of the calibration curve. In preferred embodiments, the servers 6a, b would maintain one file directory including factory provided calibration files and another file directory with user generated calibration files incorporating the halftone attributes in the file name. The servers 6a, b would further include an additional directory of screen files incorporating the screen name into the file name of the screen. The screen name is described according to a printer model and screen type pair, e.g., IBM851pi. The first part of the screen name identifies the printer model, and the second part identifies the screen by an arbitrary name, such as the screen frequency, lines per inch (LPI), a name of the screen, etc. Still further, other naming conventions could apply. The screen name would map to specific printers 8a, b, c and 10a, b which use the particular screening algorithm.

In preferred embodiments, the servers 6a, b store screen algorithms, calibration curves, and print patches. Users at the clients 4a, b may provide additional screen algorithms, print patches, and calibration curves to the servers 6a, b. In such case, the servers 6a, b would register any user provided print patches, screen algorithms, and calibration curves. The servers 6a, b would use the uniform naming convention to manage all the different calibration curves, screen names, and other files in the system. In this way, a calibration curve, screening file or patch is registered by being placed in the appropriate directory storing such files and provided a name following the above described naming conventions.

In preferred embodiments, the servers 6a, b would include a system directory for storing default calibration curves for default screening algorithms, along with default printer patches. The servers 6a, b would also maintain a user directory to store any user generated or provided calibration curves, print patches, and screening algorithms. Note that a user generated calibration file in the user directory might have been generated using a screening algorithm and printer patch from the system directory. In such case, only the user generated calibration curve would be stored in the user directory, and the default or factory provided screening algorithm to use with the user generated calibration curve would be maintained in the system directory. In preferred embodiments, the servers 6a, b would include a printer resource table indicating the location in the servers 6a, b of screening files, calibration files, and print patches.

Figure 2:
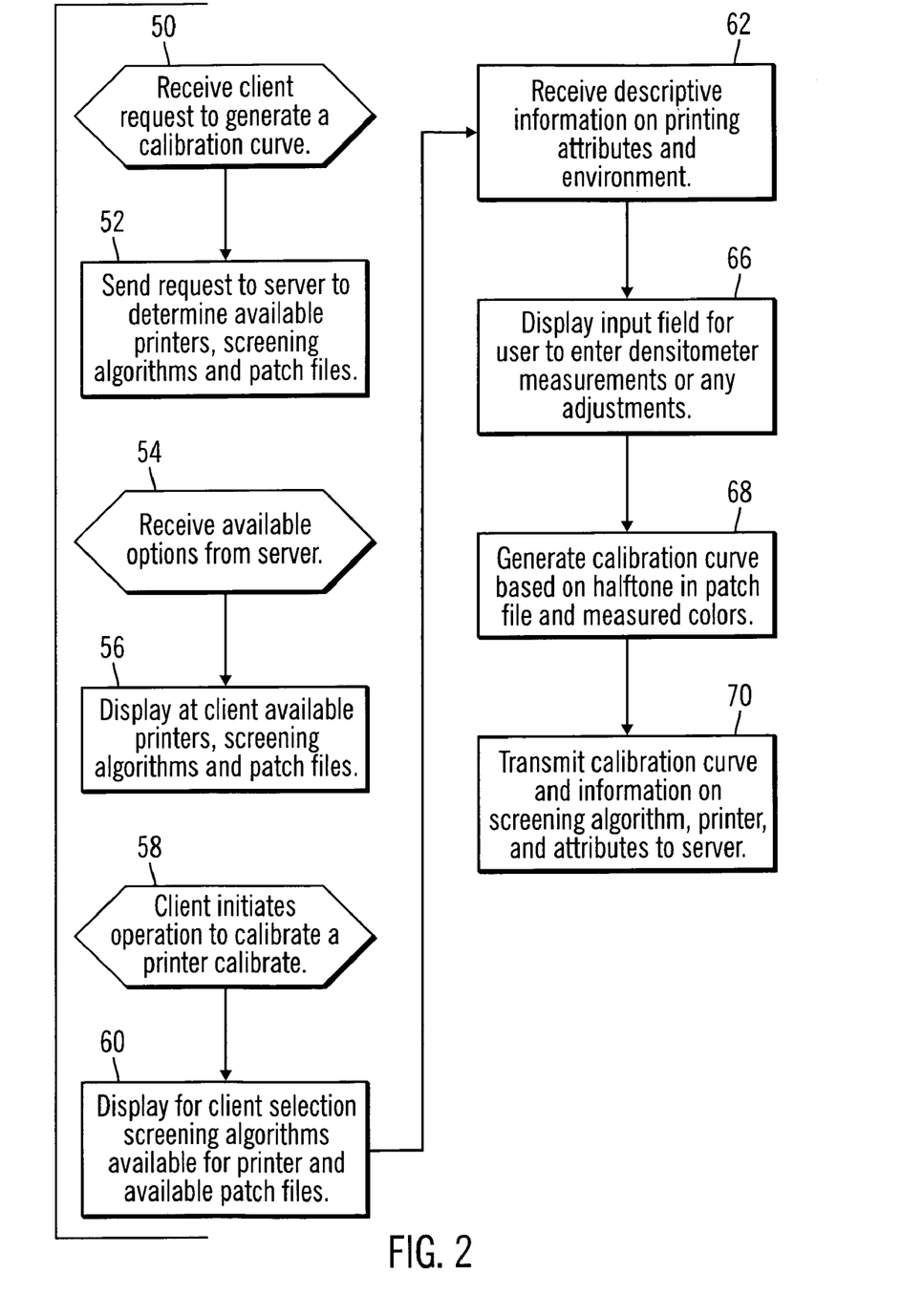
FIG. 2 illustrates logic implemented in client printer software to generate a calibration file in accordance with preferred embodiments of the present invention.

FIG. 2 illustrates logic implemented in client printing software, such as the Infoprint submit software, executing within the clients 4a, b to generate a calibration file given user specified output appearance attributes. Control begins at block 50 with the client printing software logging onto the server 6b to access the network printing system. At this point, the client printing software sends (at block 52) a request to the server 6a, which is processed by the server printing software, such as the IBM Infoprint Manager, to determine available printers, screening algorithms for each printer, and patch files. After receiving (at block 54) the requested information from the server 6a, b, the client printing software displays (at block 56) a graphical user interface (GUI) at the client 4a, b in which the user will select calibration options. At block 58, a user at the client would initiate an operation to calibrate a printer. In response, the client printing software determines and displays (at block 60) the screening algorithms available at the selected printer and available patch files, which were received when the client logged onto the server.

The user may also enter (at block 62) in the GUI descriptive information about the desired output appearance, such as a type of paper used during calibration, toner, temperature, target printer model to emulate, etc. Such descriptive information may be in the form of pre-defined codes that have a particular meaning, such as paper, toner, target printer to emulate, etc. Alternatively, the user may create a descriptive output-appearance code, and then in another field provide an explanation of such code. This explanatory information would remain associated with the code in case another user at another client wanted to determine the meaning of the code. The client printing software then submits to the server 6a, b the user generated calibration job including information on a user selected printer, screening algorithm, patch file, and output-appearance information. The server 6a or b then prints the job on the appropriate printer. After the job is printed, the user would use a densitometer to measure the density of the printed output to determine the color values of the output. The client printing software, after printing the patch files, would display (at block 66) a table in which the user would enter densitometer measurements. At this point, the user may alter or modify any densitometer values as desired. After the measurements are entered, the client printing software, in response to a user request, would generate (at block 68) the calibration curve, using mathematical interpolation techniques known in the art, that provide a mapping between the color space for the print patches and the output color values determined by the densitometer. The client printing software would then transmit (at block 70) the generated calibration file, along with user entered information, such as the printer, screening algorithm, and output-appearance attribute information to the server 6a, b.

Figure 3:
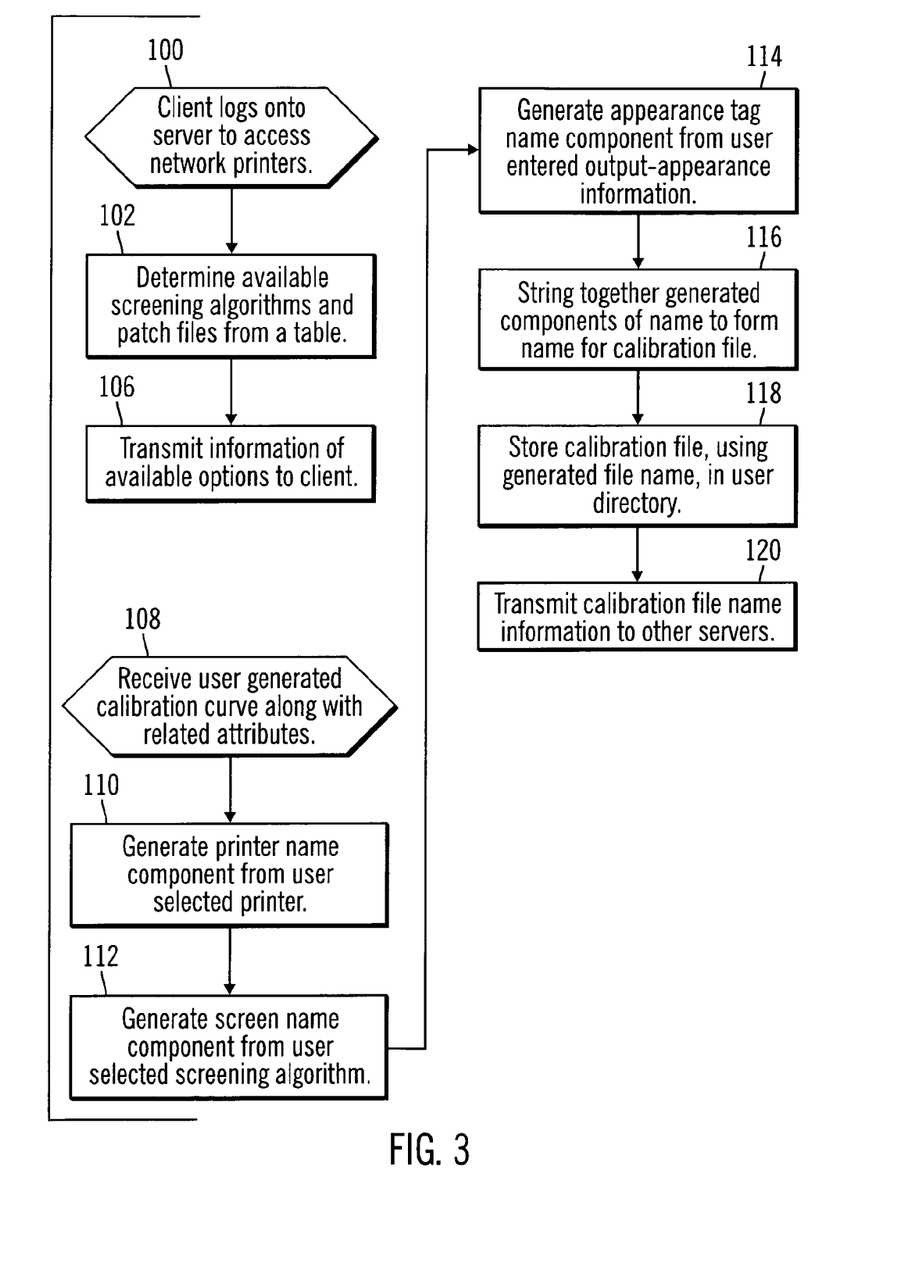
FIG. 3 illustrates logic implemented in server printer software to generate a file name for the user generated calibration file in accordance with preferred embodiments of the present invention.

FIG. 3 illustrates logic implemented in server printing software, such as the IBM Infoprint Manager software, within the servers 6a, b to respond to user requests for calibration information and to manage a user generated calibration file. At block 100, the server 6a, b receives a client request for available calibration options. Such request would be sent from the client 4a, b at block 52. The server printing software then determines available printing resources, such as printers, screening algorithm, patch files, and calibration files. In preferred embodiments, each server 6a, b would include a printer resource table of the calibration files, printers, and screening algorithms available at every server 6a, b in the network printing system 2. The server 6a, b then transmits (at block 106) information on the available requested printers, screening and patch files to the client 4a, b.

Block 108 initiates the logic for the server printing software to manage a user generated calibration file. At block 108, the server printing software receives the user generated calibration file and information the user entered at the client 4a, b GUI when generating the calibration file, including the screening algorithm, printer, and output-appearance attributes, along with any explanatory definitions of output-appearance attribute codes. The server printing software then generates: a printer name component from the user selected printer (at block 110); a screen name component from the user selected screening algorithm (at block 112); and an appearance tag including user specified output-appearance attributes (at block 114). The server printing software then strings together (at block 116) these generated component names to form a single file name to use for the user generated calibration file. This calibration file having the generated file name is then stored (at block 118) in the user directory in the server 6a, b. At block 120, the server printing software transmits the calibration file name information to other servers 6a or b. In this way, each server 6a, b maintains information on available calibration files in the other servers. Further, if a calibration file is deleted, then information on the deleted calibration file is submitted to the other servers to insure that those servers will no longer offer the output-appearance attributes supported only by the deleted calibration file.

Preferably, a server would maintain the calibration and screening files for those printers managed at the server. Thus, server 6a would maintain calibration and screening files for printers 8a, b, c and server 6b would maintain such files for printers 10a, b. In preferred embodiments, if one server received a request to print a job using calibration, screening files, and a printer managed by another server, then that receiving server could forward the print job to the print server supporting the printer designated for the print job.

When assembling a print job at the client 4a, b, the client printing software would display to the user a print job submit GUI that displays various options to select to generate the print job. In preferred embodiments, the client printing software could display to the user different available printers, screening algorithms to use, and output appearance attributes of the calibration files. Descriptive information on the available screening algorithms and output-appearance options may be displayed in the GUI to assist the user in selecting the appropriate screening algorithm and calibration file to use. The output-appearance attributes displayed would correspond to output-appearance attributes incorporated into available calibration curves. As discussed, this output appearance information could be displayed as a code, with an explanation as to the meaning of the code, or just displayed as a descriptive word, enhtoner for enhanced toner, 201b for twenty pound paper, highlight-midtones, dark, standard, DocuTech, indicating emulation of a specific Xerox DOCUTECH printer, etc.

Note that for any printer, there are specific available screening algorithms, and for each printer/screening algorithms there may be specific output-appearance attributes incorporated into calibration curves for the printer/screening algorithm combination. These relationships may be maintained in the client printing software to not allow a user to select a printer and then a screening algorithm unavailable at the printer, or select a printer and screening algorithm and then an output-appearance attribute, i.e., calibration file, not supported for the selected printer/screening algorithm. The client printing software would obtain information on the relationship of printers, screening files, and output-appearance attributes from the servers 6a, b. Further, the client printing software GUI may just display printer and available output-appearance combinations. Upon selection of a printer and output-appearance options, the client or server printing software could automatically determine the appropriate screening algorithm to include in the halftone attributes submitted with the print job.

The user would select the print job, printer to use, and available screening algorithm and output appearance attributes to use to print the print job. In submitting the print job, the print job submit program would generate a halftone attribute of the print job having two component parts, the screen name of the screening file and the output appearance name associated with one of the calibration curves. This halftone attribute would be submitted with the print job.

Figure 4:
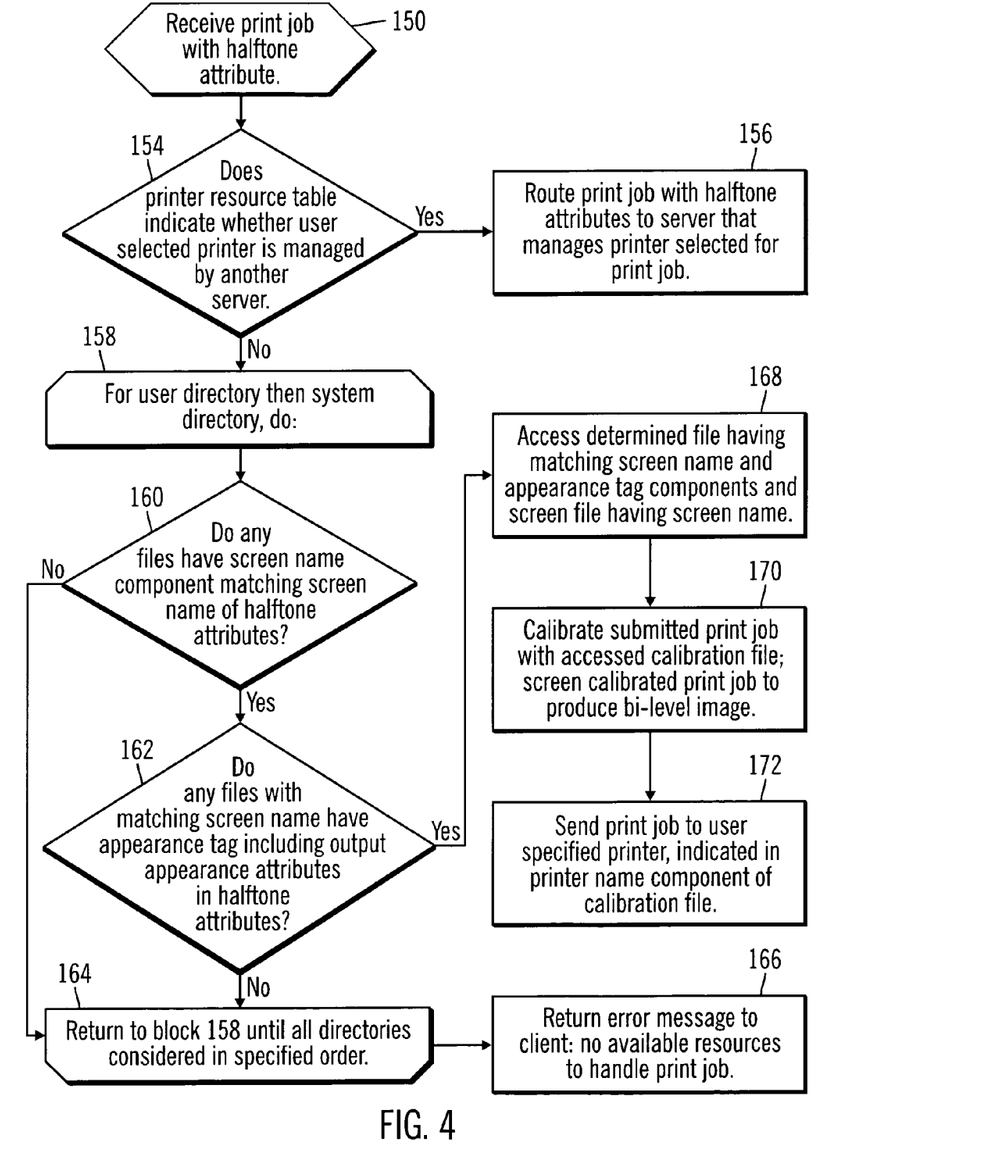
FIG. 4 illustrates logic implemented din the server printer software to handle a print job request and submitted halftone attributes in accordance with preferred embodiments of the present invention.

FIG. 4 illustrates logic implemented in the server printing software to perform job validation on a received print job and associated halftone attributes to determine whether one of the calibration files supports the user selected halftone attributes. Control begins at block 150 with the server printing software receiving a print job submitted from the client print software along with associated halftone attributes, having the format: "screen name:output appearance." The server printing software determines (at block 152) whether the printer resource table indicates that the printer 8a, b, c or 10a, b, c the user selected to print the print job is managed by another server 6a orb. If so, the server 6a orb routes (at block 156) the print job along with the halftone attributes to the server 6a, b that manages the user selected printer. This server then performs the steps at blocks 158 to 172 to handle the print job. Otherwise, if the printer 8a, b, c or 10a, b is managed by the server 6a or b receiving the print job, then the server printing software begins a loop at block 158 to execute for every directory storing calibration files, including the user and system directories. In preferred embodiments, the directories are considered in a hierarchical order. For instance, the user directory may be searched first to provide selection preference to user generated calibration files over default calibration files stored in the system director.

Within this loop, the server printing software determines (at block 160) whether the selected directory including the calibration files includes a calibration file having a screen name component that matches the screen name of the halftone attribute. Alternatively, the server printing software can further look for calibration file names that have a printer name matching the user selected printer. If so, then the server printing software determines (at block 162) whether any files with the matching screen name component have an appearance tag including the output-appearance attributes specified in the halftone attributes submitted with the print job. If there is no calibration file that includes both a matching screen name and appearance tag component, then the server printing software returns (at block 164) to block 158 to consider the next directory that includes calibration files. If all directories at the server 6a, b including calibration files have been considered without finding a match, then the server printing software returns (at block 166) an error message to the submitting client 4a, b that there are no available resources to process the specific print job, i.e., that the job could not be validated with the available printing resources. The server printing software may indicate the user selected screen file and/or selected output appearance attributes that are not supported.

If there is a calibration file having screen name and appearance tag attributes matching those of the halftone attributes, then the server printing software has validated the print job by finding a calibration file satisfying the halftone attributes associated with the print job. The server printing software then accesses (at block 168) the determined calibration file having the matching screen name and appearance tag components and the screen file having the screen name. The server printing software calibrates (at block 170) the halftone of the submitted print job with the accessed calibration file and then applies the accessed screening algorithm to derive the bi-level image from the calibrated halftone. In implementation, the steps of calibrating the file and halftoning or screening the file are performed in a single operation. Thus, portions of the file are calibrated and halftoned (RiPped) together. This generated bi-level image is routed to the printer 8*a, b, c* or 10*a, b* (at block 172) that supports the screening file. This printer would be the same model or printer indicated in the printer name component of the calibration file name.

In further embodiments, both the calibration file generation and calibration of input files may specify an engine when the printer being calibrated or printing has more than one engine. For instance, when generating a calibration file for a two engine printer, the user may specify not only the output appearance attributes, but the engine to print the patches. If two engines in the same printer are being calibrated, then separate calibration files may be generated for each engine. In such case, the calibration file for the first engine may have the same name as described above and the calibration file for the second engine would include a field identifying the second engine. In this way, when a duplex print job is calibrated for printing with two different engines, those pages of the print job being printed on the first engine could be calibrated with the calibration file generated using the first engine and those pages of the print job being printed on the second engine could be calibrated using the calibration file generated with the second engine, and including the field indicating the second engine.

When building a print job, the user may assign print engines to specific pages within the print job by specifying an engine, start page, cycle length and optional switch over point. The start page indicates the engine where first page prints and the cycle length indicates how many consecutive pages print on the same engine. When printing a booklet, the user may specify a switch over page, which indicates a page to be printed on the other engine. The pages from the switch over page and the following pages in the cycle length are then printed on the opposite engine. When the user submits such a print job along with selected output-appearances, the server printing software would access the calibration files matching the output appearances for both engines and then calibrate the gray scale images of the pages with a calibration file calibrated for the user selected output appearance and engine. In this way, different pages in the same print job may be calibrated with calibration files that differ according to print engine to make the calibration print engine specific. The server printing software would determine the engine to use from the engine, start page, cycle length and switchover information the user provided with the print job, and then, after determining which pages are printed according to which engine, select the engine specific calibration files for calibrating the input pages of the print job. This allows the file naming management scheme to be extended to calibrating for different engines within the same printer.

Preferred embodiments provide a file naming management scheme for calibration files to allow a printer server to manage user generated calibration files and select the appropriate file when a print job is submitted. In particular, the system manages calibration files generated for specific printing conditions and variables, such as paper, toner, midtones, temperature, printer attributes, target printer to emulate, etc. Further, the system allows the user to generate a print job with particular output-appearance attributes that are incorporated into the calibration files to tailor the output. This allows the user to indirectly specify the correct calibration file that will support the printer and output-appearance attributes selected by the user. The system further provides programming to select the appropriate calibration file based on user selected halftone attributes. The preferred file management system allows a user to generate calibration curves for specific printing factors and then have the server automatically reuse such calibration files when the output-appearance factors associated with the calibration file are present for subsequent print jobs. Thus, preferred embodiments provide an integrated approach to calibration and screen file management to improve the printing options available to the user, including greater control over the output appearance of print jobs, and to allow for automatic selection of the most appropriate calibration file that matches the user selected attributes for the print job.

CONCLUSION/ALTERNATIVE EMBODIMENTS

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to incorporating printer, screen file, and output-appearance attributes for a calibration file into the file name of the calibration file. However, in alternative embodiments such information may be maintained at a location separate from the file name. In such case, a table or database would provide the printer, screening file, and appearance tags associated with each calibration file.

Preferred embodiments described specific output appearance factors, such as paper type used, toner, environmental factors of temperature or pressure, target printer to emulate, etc. However, the examples of output-appearance attributes and printing variables are not exhaustive, and the output appearance attributes indicated in a calibration file appearance tag may comprise any output appearance type and printing variables known in the art.

Preferred embodiments were described with respect to certain file types, such as user generated or factory default calibration curves, screening algorithms, and print patches being maintained at particular directory locations in the servers 6*a, b*. However, in further embodiments, one directory may maintain all these files or a further hierarchical divisions of directories may be provided to provide more fine grained storage of the files according to their attributes. For instance, users may generate descriptive directories that maintain certain types of calibration files, such as an enhanced toner sub-directory for storing all types of calibration files generated with enhanced toner. Still further, certain of the directories storing calibration files may be maintained at the clients instead of the servers.

In preferred embodiments the halftone attributes associated with a print job included the name of a screening name and output appearance attributes. However, in alternative embodiments other information may be included in the halftone attributes in lieu of the screening name, such as the printer name. In such case, a calibration file would be selected having the associated printer name and output appearance attributes in the halftone attributes. The screening file would be determined from the screen name component of the calibration file name.

The clients 4a, b, server 6a, b, and printers 8a, b, c, and 10a, b may be implemented in many types of computing environments, such as a network printing environment where one or more networks provide communication between the devices. Alternatively, in a desktop environment, the client and server printing programs may be implemented in a single desktop machine, such as a personal computer or workstation, that is connected to a printer. In such case, the calibration, screening and patch files would be maintained at the system in which print jobs are generated. Numerous other configurations are also possible.

Preferred embodiments described the servers 6a, b communicating in a peer to peer relationship, and the clients 4a, b communicating with the servers 6a, b over a network. However, alternative network configurations known in the art may be provided for communication between the components.

The printers may be a contone printer and/or a bi-level printer. A contone printer uses a combination of dithering and printing at different levels of intensity to produce different colors and different shades of lightness and darkness. Unlike a true continuous-tone printer, contone printers can lay down at ink at only a few different levels of intensity (usually 8). To produce the full range of colors that can be perceived by the human eye, they must also use dithering techniques. Many of the newer color laser printers are contone printers.

In summary, preferred embodiments disclose a system, method, and program for managing calibration files in a printing system. Patches are printed using a screening algorithm and incorporating at least one output appearance factor. A calibration file is generated from measured color values of the printed patches mapping a color space for the printed patches to a color space of a printer used to print the patches. Information is associated with the calibration file indicating the printer and at least one output appearance attribute for use in selecting one calibration file to use when printing a print job.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing calibration files in a printing system, comprising:
    printing patches using a screening algorithm and incorporating at least one output appearance factor;
    generating a calibration file from measured color values of the printed patches mapping a color space for the printed patches to a color space of a printer used to print the patches; and
    associating information with the calibration file indicating the printer and at least one output appearance attribute for use in selecting one calibration file to use when printing a print job, wherein the at least one output appearance attribute provides descriptive information on at least one output appearance factor incorporated when printing the patches.

2. The method of claim 1 wherein the associated printer information indicates the name of the screening algorithm used in generating the calibration file.

3. The method of claim 1, wherein the at least one output appearance factor is a member of a set of printing variables consisting of toner, paper type, environmental factors, desired output, and target printer to emulate.

4. A method for managing calibration files in a printing system, comprising:
    selecting one printer, one screening algorithm for the selected printer, and at least one output appearance factor of the print job;
    printing patches using the selected screening algorithm and incorporating the selected at least one output appearance factor;
    generating a calibration file from measured color values of the printed patches mapping a color space for the printed patches to a color space of a printer used to print the patches; and
    associating information with the calibration file by associating: a printer name indicating the selected printer; a screening name indicating the selected screening algorithm; and an appearance tag indicating the selected at least one output appearance factor for use in selecting one calibration file to use when printing a print job.

5. The method of claim 4, wherein associating information with the calibration file comprises creating a file name for the calibration file including the printer name, the screening name, and the appearance tag.

6. The method of claim 1, further comprising:
    generating the print job comprising a gray scale image; and
    associating output appearance and printer attribute information with the print job for use in selecting one calibration file to use to calibrate the gray scale image when printing the print job.

7. The method of claim 6, wherein selecting one calibration file comprises selecting one calibration file having associated output appearance and printer information indicating compatibility with the printer and output appearance information associated with the print job.

8. The method of claim 7, wherein determining compatibility of a print job and calibration file comprises:
    searching a directory of calibration files for calibration files having associated printer information matching the printer information associated with the print job, wherein matching printer information indicates that the printer selected to print the print job matches the printer used to print the patches considered when generating the calibration file; and selecting from the calibration files generated with the printer associated with the print job one calibration file associated with at least one output appearance attribute that matches the at least one output appearance attribute associated with the print job, wherein the selected calibration file is used to print the print job.

9. The method of claim 8, wherein there are multiple directories including calibration files, wherein a first directory is searched for calibration files compatible with the print job and a second directory is searched next, wherein the first found compatible calibration file is used to calibrate the gray scale image.

10. The method of claim 6, wherein associating output appearance and printer attribute information with the print job comprises:
determining printers available to print a print job and output appearances supported by the printer;
displaying the available printers and output appearances; and
receiving user input indicating one of the displayed printers and at least one of the displayed output appearances to associate with the print job.

11. The method of claim 1, wherein printing the patches comprises selecting: one printer having multiple printing engines, one screening algorithm for the selected printer, and at least one output appearance factor of the print job, and wherein associating information with the calibration file comprises associating: a printer name indicating the selected printer; a screening name indicating the selected screening algorithm; an appearance tag indicating the selected at least one output appearance factor; and an indication of the printer engine used to print the calibration file.

12. The method of claim 11, further comprising:
generating the print job comprising a gray scale image; and
associating output appearance and printer attribute information with the print job, and associating one of the printer engines with specific pages within the print job, such that one printer engine is selected for use with a first set of pages and another printer engine is selected for use with a second set of pages, wherein the information associated with the print job is used to select one printer engine specific calibration file to use to calibrate the pages of the gray scale image when printing the print job.

13. The method of claim 12, wherein selecting one calibration file to use to print the first and second sets of pages within the print job comprises selecting one calibration file having associated output appearance, printer, and printer engine information indicating compatibility with the printer, printer engine, output appearance information associated with the first and second sets of pages of the print job.

14. A system for managing calibration files in a printing system, comprising:
a computer system;
a printer in communication with the computer;
a storage device accessible to the computer system;
program logic implemented within the computer, comprising:
(i) means for printing patches using a screening algorithm and incorporating at least one output appearance factor;
(ii) means for generating a calibration file from measured color values of the printed patches mapping a color space for the printed patches to a color space of the printer used to print the patches;
(iii) means for associating information with the calibration file indicating the printer and at least one output appearance attribute for use in selecting one calibration file to use when printing a print job, wherein the at least one output appearance attribute provides descriptive information on at least one output appearance factor incorporated when printing the patches; and
(iv) means for storing the calibration file and associated information in the storage device.

15. The system of claim 14, wherein the computer system comprises a client computer and a server, wherein the client computer, server, and printer communicate using at least one network communication line, wherein the program logic is implemented in the client and server, wherein the client communicates commands to the server to cause the server to print patches on the printer, generate the calibration file, associate information with the calibration file, and store the calibration file and associated information in the storage device.

16. The system of claim 14, wherein the associated printer information indicates the name of the screening algorithm used in generating the calibration file.

17. The system of claim 14, wherein the at least one output appearance factor is a member of a set of printing variables consisting of toner, paper type, environmental factors, desired output, and target printer to emulate.

18. A system for managing calibration files in a printing system, comprising:
a computer system;
a printer in communication with the computer;
a storage device accessible to the computer system;
program logic implemented within the computer, comprising:
(i) means for selecting one printer, one screening algorithm for the selected printer, and at least one output appearance factor of the print job;
(ii) means for printing patches using the selected screening algorithm and incorporating the selected at least one output appearance factor;
(iii) means for generating a calibration file from measured color values of the printed patches mapping a color space for the printed patches to a color space of the printer used to print the patches;
(iv) means for associating information with the calibration file by associating: a printer name indicating the selected printer; a screening name indicating the selected screening algorithm; and an appearance tag indicating the selected at least one output appearance factor for use in selecting one calibration file to use when printing a print job; and
(iv) means for storing the calibration file and associated information in the storage device.

19. The system of claim 18, wherein the program logic for associating information with the calibration file comprises means for creating a file name for the calibration file including the printer name, the screening name, and the appearance tag.

20. The system of claim 14, wherein the program logic further comprises:
means for generating the print job comprising a gray scale image; and
means for associating output appearance and printer attribute information with the print job for use in selecting one calibration file to use to calibrate the gray scale image when printing the print job.

21. The system of claim 20, wherein the program logic for selecting one calibration file comprises means for selecting one calibration file having associated output appearance and printer information indicating compatibility with the printer and output appearance information associated with the print job.

22. The system of claim 21, wherein the program logic for determining compatibility of a print job and calibration file comprises:
    means for searching a directory of calibration files in the storage device for calibration files having associated printer information matching the printer information associated with the print job, wherein matching printer information indicates that the printer selected to print the print job matches the printer used to print the patches considered when generating the calibration file; and
    means for selecting from the calibration files generated with the printer associated with the print job one calibration file associated with at least one output appearance attribute that matches the at least one output appearance attribute associated with the print job, wherein the selected calibration file is used to print the print job.

23. The system of claim 22, wherein the storage device includes multiple directories including calibration files, wherein a first directory in the storage device is searched for calibration files compatible with the print job and a second directory in the storage device is searched next, wherein the first found compatible calibration file is used to calibrate the gray scale image.

24. The system of claim 20, wherein the program logic for associating output appearance and printer attribute information with the print job comprises:
    means for determining printers available to print a print job and output appearances supported by the printer;
    means for displaying the available printers and output appearances; and
    means for receiving user input indicating one of the displayed printers and at least one of the displayed output appearances to associate with the print job.

25. The system of claim 14, wherein the program logic for printing the patches comprises means for selecting: one printer having multiple printing engines, one screening algorithm for the selected printer, and at least one output appearance factor of the print job, and wherein the program logic for associating information with the calibration file comprises means for associating: a printer name indicating the selected printer; a screening name indicating the selected screening algorithm; an appearance tag indicating the selected at least one output appearance factor; and an indication of the printer engine used to print the calibration file.

26. The system of claim 25, wherein the program logic further comprises:
    means for generating the print job comprising a gray scale image; and
    means for associating output appearance and printer attribute information with the print job, and means for associating one of the printer engines with specific pages within the print job, such that wherein one printer engine is selected for use with a first set of pages and another printer engine is selected for use with a second set of pages, wherein the information associated with the print job is used to select one printer engine specific calibration file to use to calibrate the pages of the gray scale image when printing the print job.

27. The system of claim 26, wherein the program logic for selecting one calibration file to use to print the first and second sets of pages within the print job comprises means for selecting one calibration file having associated output appearance, printer, and printer engine information indicating compatibility with the printer, printer engine, output appearance information associated with the first and second sets of pages of the print job.

28. An article of manufacture for use in managing calibration files in a printing system, the article of manufacture comprising computer usable media including at least one computer program embedded therein that causes the computer to perform:
    printing patches using a screening algorithm and incorporating at least one output appearance factor;
    generating a calibration file from measured color values of the printed patches mapping a color space for the printed patches to a color space of a printer used to print the patches; and
    associating information with the calibration file indicating the printer and at least one output appearance attribute for use in selecting one calibration file to use when printing a print job, wherein the at least one output appearance attribute provides descriptive information on at least one output appearance factor incorporated when printing the patches.

29. The article of manufacture of claim 28, wherein the associated printer information indicates the name of the screening algorithm used in generating the calibration file.

30. The article of manufacture of claim 28, wherein the at least one output appearance factor is a member of a set of printing variables consisting of toner, paper type, environmental factors, desired output, and target printer to emulate.

31. An article of manufacture for use in managing calibration files in a printing system, the article of manufacture comprising computer usable media including at least one computer program embedded therein that causes the computer to perform:
    selecting one printer, one screening algorithm for the selected printer, and at least one output appearance factor of the print job;
    printing patches using the selected screening algorithm and incorporating the selected at least one output appearance factor;
    generating a calibration file from measured color values of the printed patches mapping a color space for the printed patches to a color space of a printer used to print the patches; and
    associating information with the calibration file by associating: a printer name indicating the selected printer; a screening name indicating the selected screening algorithm; and an appearance tag indicating the selected at least one output appearance factor
for use in selecting one calibration file to use when printing a print job.

32. The article of manufacture of claim 31, wherein associating information with the calibration file comprises creating a file name for the calibration file including the printer name, the screening name, and the appearance tag.

33. The article of manufacture of claim 28, further comprising:
    generating the print job comprising a gray scale image; and
    associating output appearance and printer attribute information with the print job for use in selecting one calibration file to use to calibrate the gray scale image when printing the print job.

34. The article of manufacture of claim 33, wherein selecting one calibration file comprises selecting one calibration file having associated output appearance and printer information indicating compatibility with the printer and output appearance information associated with the print job.

35. The article of manufacture of claim 34, wherein determining compatibility of a print job and calibration file comprises:

searching a directory of calibration files for calibration files having associated printer information matching the printer information associated with the print job, wherein matching printer information indicates that the printer selected to print the print job matches the printer used to print the patches considered when generating the calibration file; and     selecting from the calibration files generated with the printer associated with the print job one calibration file associated with at least one output appearance attribute that matches the at least one output appearance attribute associated with the print job, wherein the selected calibration file is used to print the print job.

36. The article of manufacture of claim 35, wherein there are multiple directories including calibration files, wherein a first directory is searched for calibration files compatible with the print job and a second directory is searched next, wherein the first found compatible calibration file is used to calibrate the gray scale image.

37. The article of manufacture of claim 33, wherein associating output appearance and printer attribute information with the print job comprises:

determining printers available to print a print job and output appearances supported by the printer;

displaying the available printers and output appearances; and     receiving user input indicating one of the displayed printers and at least one of the displayed output appearances to associate with the print job.

38. The article of manufacture of claim 28, wherein printing the patches comprises selecting one printer having multiple printing engines, one screening algorithm for the selected printer, and at least one output appearance factor of the print job, and wherein associating information with the calibration file comprises associating: a printer name indicating the selected printer; a screening name indicating the selected screening algorithm; an appearance tag indicating the selected at least one output appearance factor; and an indication of the printer engine used to print the calibration file.

39. The article of manufacture of claim 38, further comprising:

generating the print job comprising a gray scale image; and     associating output appearance and printer attribute information with the print job, and associating one of the printer engines with specific pages within the print job, such that one printer engine is selected for use with a first set of pages and another printer engine is selected for use with a second set of pages, wherein the information associated with the print job is used to select one printer engine specific calibration file to use to calibrate the pages of the gray scale image when printing the print job.

40. The article of manufacture of claim 39, wherein selecting one calibration file to use to print the first and second sets of pages within the print job comprises selecting one calibration file having associated output appearance, printer, and printer engine information indicating compatibility with the printer, printer engine, output appearance information associated with the first and second sets of pages of the print job.

* * * * *